United States Patent
Groteke et al.

(10) Patent No.: US 6,555,050 B1
(45) Date of Patent: Apr. 29, 2003

(54) DROSS PROCESSING SYSTEM

(75) Inventors: Daniel E. Groteke, St. Joseph, MI (US); Earl J. Becher, St. Joseph, MI (US); Timothy J. Judkins, Stevensville, MI (US); Joseph A. Judkins, Stevensville, MI (US)

(73) Assignee: Q. C. Designs, Inc., Saint Joseph, MI (US)

( * ) Notice: Subject to any disclaimer, the term of this patent is extended or adjusted under 35 U.S.C. 154(b) by 0 days.

(21) Appl. No.: 09/947,043

(22) Filed: Sep. 5, 2001

Related U.S. Application Data
(60) Provisional application No. 60/230,959, filed on Sep. 7, 2000.

(51) Int. Cl.$^7$ .................................................. C21C 5/32
(52) U.S. Cl. ........................... 266/78; 266/80; 266/205; 266/227; 266/275
(58) Field of Search ........................... 266/78, 80, 205, 266/227, 275

(56) References Cited

U.S. PATENT DOCUMENTS

| | | | |
|---|---|---|---|
| 3,198,505 A | 8/1965 | Amdur et al. | 266/37 |
| 4,121,810 A | 10/1978 | Lui et al. | 266/201 |
| 4,440,640 A | 4/1984 | Groteke et al. | 210/237 |
| 5,906,790 A | 5/1999 | Bramley | 266/205 |
| 6,136,262 A | 10/2000 | Groteke | 266/165 |
| 6,235,234 B1 | 5/2001 | Hennessy et al. | 266/44 |
| 6,464,929 B1 * | 10/2002 | Groteke | 266/205 |

FOREIGN PATENT DOCUMENTS

| | | | |
|---|---|---|---|
| JP | 51-66213 | 6/1976 | 75/672 |

\* cited by examiner

*Primary Examiner*—Melvyn Andrews
(74) *Attorney, Agent, or Firm*—Michael J. Weins; Jeffrey E. Semprebon

(57) ABSTRACT

A dross processing system has a motor mounted to a motor support arm by a motor support carriage, and has a carriage guide which engages the motor support carriage to guide the motor along a vertical path between a raised position and a lowered position. The motor is moved by a motor height actuator connected between the motor support arm and the motor support carriage. A hood having a hood rim and a hood upper structure is configured to be engaged by the motor support carriage when moved to the raised position. When the motor is moved to the lowered position, the hood rim engages a reaction vessel upper rim. The motor support arm can rotate between a loading/dumping position and an operating position. The dross processing system can be partially automated by a microprocessor. A preferred impeller for agitating dross and a plug setting tool can be employed.

20 Claims, 6 Drawing Sheets

DROSS PROCESSING SYSTEM

BACKGROUND OF THE INVENTION

To recover entrapped metal from drosses formed on melting and holding furnaces, the dross is placed in a reaction vessel and an exothermic flux is added to the dross. The dross is frequently agitated to promote coalescence of metal droplets therein. A molten metal pool forms in the bottom of the reaction vessel as the droplets coalesce. The molten metal pool is removed by draining through a bottom port. The demetallized or spent dross is then removed from the reaction vessel.

One preferred apparatus for recovering metal employing such a method is described in U.S. patent application Ser No. 09/654,314, now U.S. Pat. No. 6,464,929 for which one of the present inventors is the inventor. While the apparatus of the '314 application can greatly facilitate recovery of metal from drosses, the apparatus has some limitations.

The apparatus of the '314 application employs a motor to drive an impeller to agitate the dross while it is held in the reaction vessel. This apparatus, in some embodiments, has a motor which is raised and lowered by moving a motor arm to which the motor is mounted. Employing such a structure to position the motor can limit the degree of control over vertical position of the motor and the impeller, and can result in gyrations of the impeller when it encounters irregularities in the dross. These gyrations can result in damage of the impeller and/or the reaction vessel.

In some preferred embodiments, the apparatus of the '314 application has a protective shield or hood which is mounted above the impeller. Frequently, the shield is positioned such that the impeller enters the dross before such time as the shield is in place, allowing fumes generated in the reaction vessel to escape. Furthermore, the design of the shields of the '314 application is such that they tend to a safety hazard as they are moved into position.

Another limitation is that the system of the '314 application is designed to be operated manually, and thus depends on the skill of the operator as well the operator's willingness to take the extra steps necessary to recover metal from the dross.

Thus, there is a need for a dross processing system which overcomes the problems discussed above.

OBJECTS OF THE INVENTION

It is an object of the invention to provide a dross reclaiming system which employs a reaction vessel covered by a hood for containment of fumes where a gravity seal is employed to maintain the hood in place on the reaction vessel.

It is another object of the invention to stabilize an impeller employed to agitate the dross against reaction forces resulting from the inhomogeneous nature of the dross.

It is a further object of the invention to provide cyclic reversing motion to the impeller to enhance separation of the metal from the dross while in the reaction vessel.

It is still a further object of the invention to provide a hood that can be swung away from the reaction vessel so as to provide an open position which enhances accessability to the reaction vessel for loading and cleaning.

It is a further object of the invention to provide a dross processing system which includes a swingable hood in combination with an impeller immobilizing mechanism to immobilize the impeller when the dross processing system is in the open position.

It is a further object of the invention to provide a dross possessing system where the position of the impeller in the reaction vessel can be varied to operate the impeller at selected depths in the dross to enhance the rate of metal separation from the dross.

It is yet another object to provide a dross processing system wherein the motions of the impeller can be programmed so as to better match the characteristics of the dross being treated.

It is another object of the invention to provide a tool for inserting a plug in a dross processing vessel when the reaction vessel is hot.

SUMMARY OF THE INVENTION

The present invention is an improved dross processing system of the type which is positionable and can be placed so as to be in close proximity with respect to a melt furnace from which the dross is to be removed. The dross processing system for which the improvement is intended has a substantially vertical support which can be positioned near the melt furnace. A reaction vessel is provided for containing the dross during the recovery process. The reaction vessel has a reaction vessel upper rim and a bottom terminating in a drain port. The reaction vessel is affixed to a reaction vessel support which in turn is pivotably mounted with respect to the substantially vertical support. Preferably, the reaction vessel is mounted to reside entirely below the reaction vessel support. The dross processing system is also provided with means for pivoting the reaction vessel between a horizontal position, where the upper rim is substantially horizontal, and a dump position, where the dross residing in the vessel is eliminated by the force of gravity.

The system to which the present improvement is applicable also has a motor mounted on a motor support arm which attaches to the substantially vertical support. The motor has a drive shaft terminating in a drive shaft free end, and can be moved between a raised motor position and one or more lowered motor positions. An impeller, having an impeller axis, attaches to the free end of the drive shaft such that, when the motor is in the raised motor position and is aligned with the reaction vessel, the impeller resides above the upper rim of the reaction vessel, and when the motor is in each of the at least one lowered motor positions and aligned with the reaction vessel, the impeller resides below the upper rim of the reaction vessel.

One aspect of the improvement of the present invention resides in providing a motor support carriage, to which the motor is mounted, and a carriage guide which attaches to the motor support arm. The carriage guide engages the motor support carriage to limit the motion of the motor so as to direct the motor along a substantially vertical path as it moves between the raised motor position and the at least one lowered motor position. The combination of the motor support carriage and the carriage guide acts to stabilize the motor, and the impeller which is mounted thereto.

Means for raising and lowering the motor support carriage relative to the motor support arm are provided, which act to move the motor and the motor support carriage between the raised motor position and each of the at least one lowered motor positions. Such means can be provided by any of the various mechanisms known in the art for raising and lowering an element of a structure. One preferred means for raising and lowering the motor support carriage is a linear actuator connected at one end to the motor support arm and at the other to the motor support carriage, which provides a means for raising and lowering the motor carriage which is simple in structure and compact. The use of the means for raising and lowering the motor support carriage relative to the motor support arm rather than moving the motor support arm to adjust the vertical position of the motor provides increased stability and positional control for the motor and the impeller.

Preferably, the carriage guide is configured not only to limit translation of the motor carriage along a substantially vertical path, but also to provide resistance to torques imparted by the action of the impeller as it agitates the dross retained in the reaction vessel. Such resistance to torques can be obtained by providing at least two stabilizing tracks, each of which slidably engages a track guide to prevent any wobbling of the motor as the impeller agitates the dross. In one preferred embodiment, the stabilizing tracks are provided by rods affixed to the motor support carriage, and the track guides are passages in the motor support arm configured to slidably engage the rods. Preferably, the stabilizing tracks and track guides are evenly spaced about the impeller axis.

While the range of motion of the motor is typically limited by the means for raising and lowering the motor support carriage and/or by the engagement between the motor support carriage and the carriage guide, in some cases it may be desirable to allow adjustably limiting the motion of the motor. Such can be achieved by employing one or more limit switches which deactivate the means for raising and lowering the motor support carriage when the motor is positioned at a desired limit of motion. The use of one or more limit switches is particularly useful to adjust the lowest lowered motor position to prevent impact of the reaction vessel by the impeller. By adjusting the position of the limit switch, the lowest lowered motor position can be altered for different configurations of impeller and/or reaction vessel.

In another aspect of the present invention, a hood is provided, having a central axis which is preferably substantially aligned with respect to the drive shaft of the motor. The hood has a downwardly extending hood rim for closing the reaction vessel to prevent escape of smoke and fumes, and a hood upper structure configured to engage the motor support carriage when the motor support carriage is moved to the raised motor position. This engagement of the hood upper structure with the motor support carriage as the motor is raised results in the hood being raised to the raised motor position along with the motor. When the motor support carriage is in the raised position, the hood rim is spaced-apart from the reaction vessel upper rim. Conversely, when the motor support carriage is moved to one of the at least one lowered motor positions, the hood rim becomes engaged with respect to the reaction vessel upper rim. In this position, the hood may directly engage the upper rim of the reaction vessel, or may engage the reaction vessel support, to which the upper rim of the reaction vessel is attached. In either case, the hood rim is brought into engagement with respect to the reaction vessel upper rim by gravity, and thus does not forcibly engage any objects which may be interposed between the hood rim and the reaction vessel upper rim, providing increased safety for the operator. Preferably, the hood upper structure is configured such that, when the motor is in one of the at least one lowered motor positions, the hood upper structure is spaced apart from the motor support carriage.

Preferably, the hood is provided with a hood port which can be opened to allow an operator to view the dross contained in the reaction vessel as it is being processed. The hood port also allows the addition of additional exothermic flux if such is needed to effectively process the dross.

Preferably, the motor support arm is configured to move between a loading/dumping position and an operating position. When the motor support arm is in the loading/dumping position, the impeller and the hood associated therewith are positioned such that their projections lie outside the footprint of the reaction vessel. When the motor support arm is in the operating position, the projection of the impeller is substantially centered with respect to the reaction vessel. Having such a loading/dumping position for the motor support arm which is displaced from the operating position facilitates loading dross into the reaction vessel for processing and dumping of the spent dross after processing, as well as reducing the required separation between the hood rim and the reaction vessel upper rim when the motor is in the raised motor position. When the motor support arm is movable, it is further preferred that both the motor and the means for raising and lowering the motor be disabled when the motor support arm is moved away from the operating position.

In a preferred embodiment, the motor support arm is rotatably mounted to the substantially vertical support to allow the motor support arm to rotate about a substantially vertical axis between the loading/dumping position and the operating position. In another aspect of the present invention, it is preferred to provide an actuating means to rotate the motor support arm between these positions, and to employ a locking means to secure the motor support arm in either position. The actuating means can be any of the various mechanisms known in the art for rotating one element with respect to another.

Preferably, the motor is operated to move the impeller in a cyclic reversing motion where the impeller is rotated in one direction for a time period, then reversed and rotated in the opposite direction for a time period, with this action being repeated for the desired processing duration. It is further preferred for the motor to have an overload sensor to reverse the direction of the motor when the impeller encounters resistance above a predetermined set point. When the motor is a hydraulic motor, such an overload sensor can be provided by a sensor which monitors the pressure in the hydraulic circuit that drives the motor and reverses the motor when the pressure increases to a predetermined level.

When it is desired to automate the operation of the dross processing system, the dross processing system can be provided with a control system for selectively and sequentially activating various elements of the system to allow the processing of the dross with minimal operator interaction. Although the control system can be built with dedicated circuits, it is preferred to employ a microprocessor with appropriate instruction sets to facilitate the automation of the operation, since its programming allows great flexibility to allow a broad range of cycles to be handled by a single control system.

The degree of control provided when a microprocessor is employed depends on the automation sought. In an elementary form, the microprocessor can be employed to control the dross processing cycle by controlling the entry of the impeller into the dross, the length of the cycle, the character of the cycle (e.g., interval motor runs in one direction before reversing, depth profile over time of the impeller, etc.), and the removal of the impeller from the dross. The parameters of the cycle depend, in part, on the characteristics of the dross. The ability to program the action of the motor allows repeating a desired cycle which has been found by experience to be effective for dross having a particular character. In a more automated system, the microprocessor can also control other aspects of the system, such as the means for pivoting the reaction vessel between a horizontal position and a dump position.

The improved dross processing system of the present invention can employ various types of impellers for stirring the reacting dross. In one preferred impeller configuration, the impeller is provided with a first agitator surface having at least one pair of first agitator blades which are opposed. When such a configuration is employed, it is further preferred that a second agitator surface be provided and that the first agitator surface have blades with opposing pitches with respect to the blades of the second agitator surface. When the reaction vessel has a sloped bottom, it is preferred for the angle of the agitator blades to match the draft angle of the bottom of the reaction vessel.

To facilitate the accurate placement of a plug to seal the drain port of the reaction vessel, a plug setting tool can be provided. The plug setting tool has a tube sized to frictionally accept the plug, and a plunger which can be depressed to eject the plug from the tube. Preferably, the tube has an end region sized to be insertable into the drain port to align the tube with the drain port before the plug is ejected from the tube into the drain port.

BRIEF DESCRIPTION OF THE FIGURES

In FIG. 1, the hood is in a raised position and in a spacedapart relationship to the reaction vessel. The system as illustrated is provided with a housing containing a control system. A user interface has a series of switches allowing a user to activate various aspects of the dross processing procedure. The system also includes a spent dross container which is supported on a platform.

As shown in FIG. 8, the plunger is positioned to load a refractory fabric plug into the tube.

BEST MODE OF CARRYING THE INVENTION INTO PRACTICE

Figure 1:
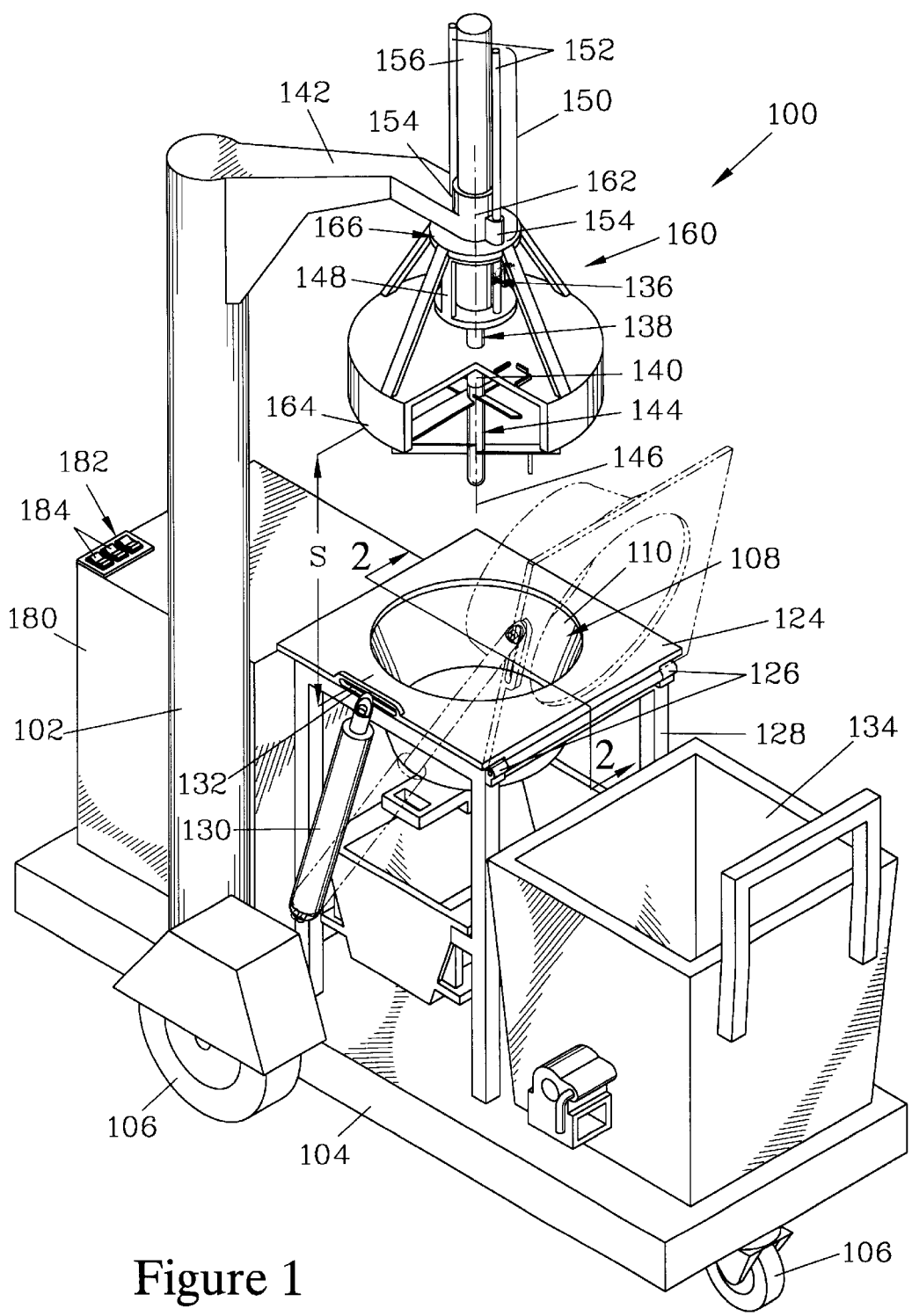
FIG. 1 is an isometric view of one embodiment of an improved dross processing system of the present invention. The dross processing system has a hood which serves to reduce radiation losses from the dross and to retain smoke and fumes generated by the dross as it is being processed in a reaction vessel.
Figure 2:
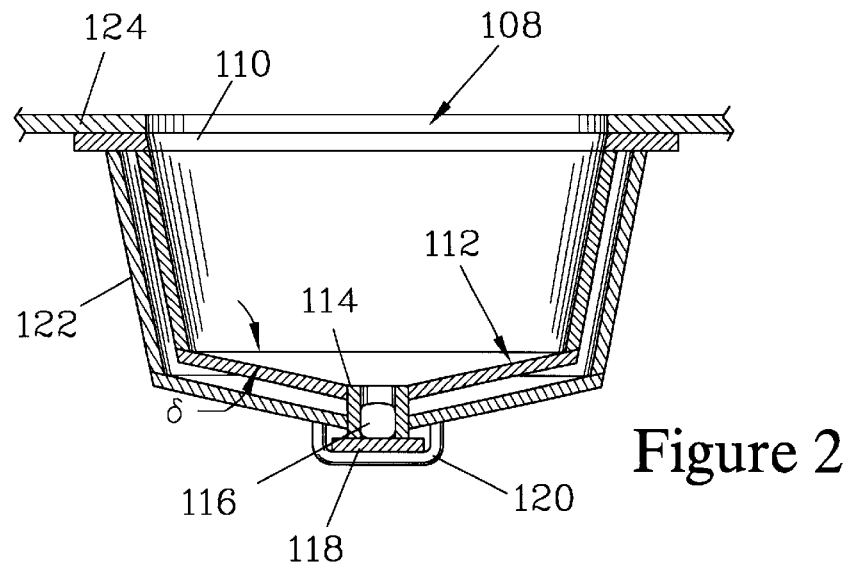
FIG. 2 is a section 2—2 of the reaction vessel of FIG. 1 and illustrates a preferred double-wall reaction vessel which is mounted below a reaction vessel support.
Figure 4:
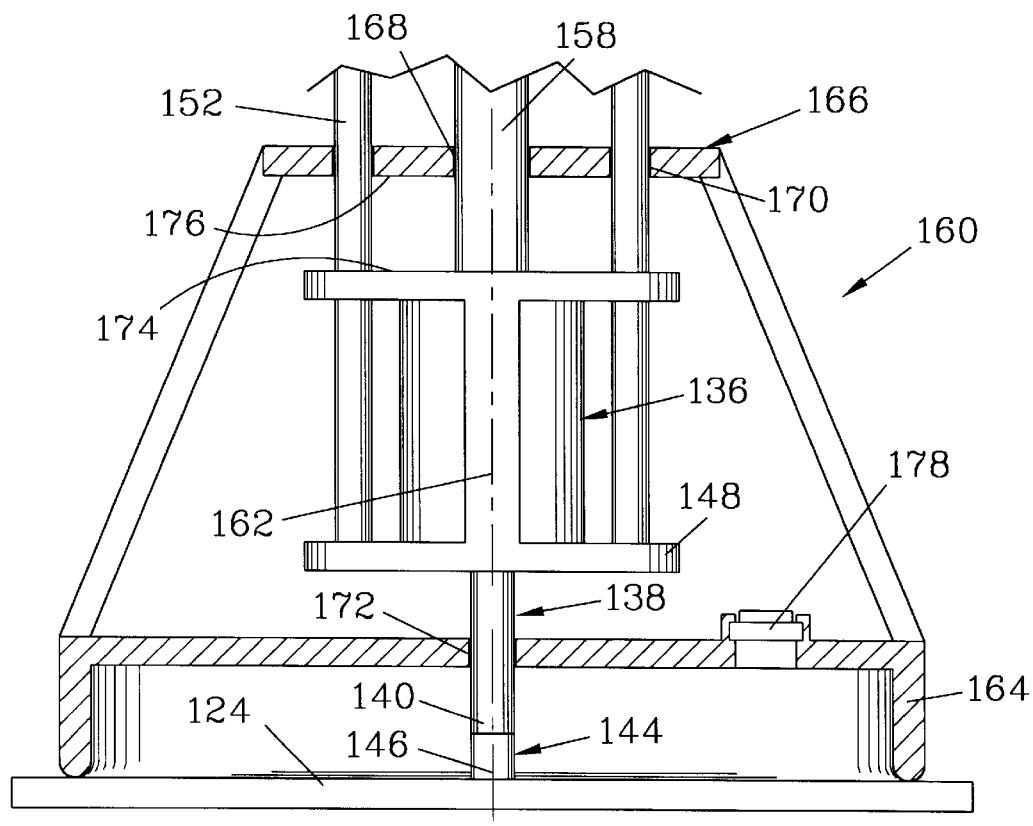
FIG. 4 is a view of the section 4—4 of FIG. 3.
Figure 3:
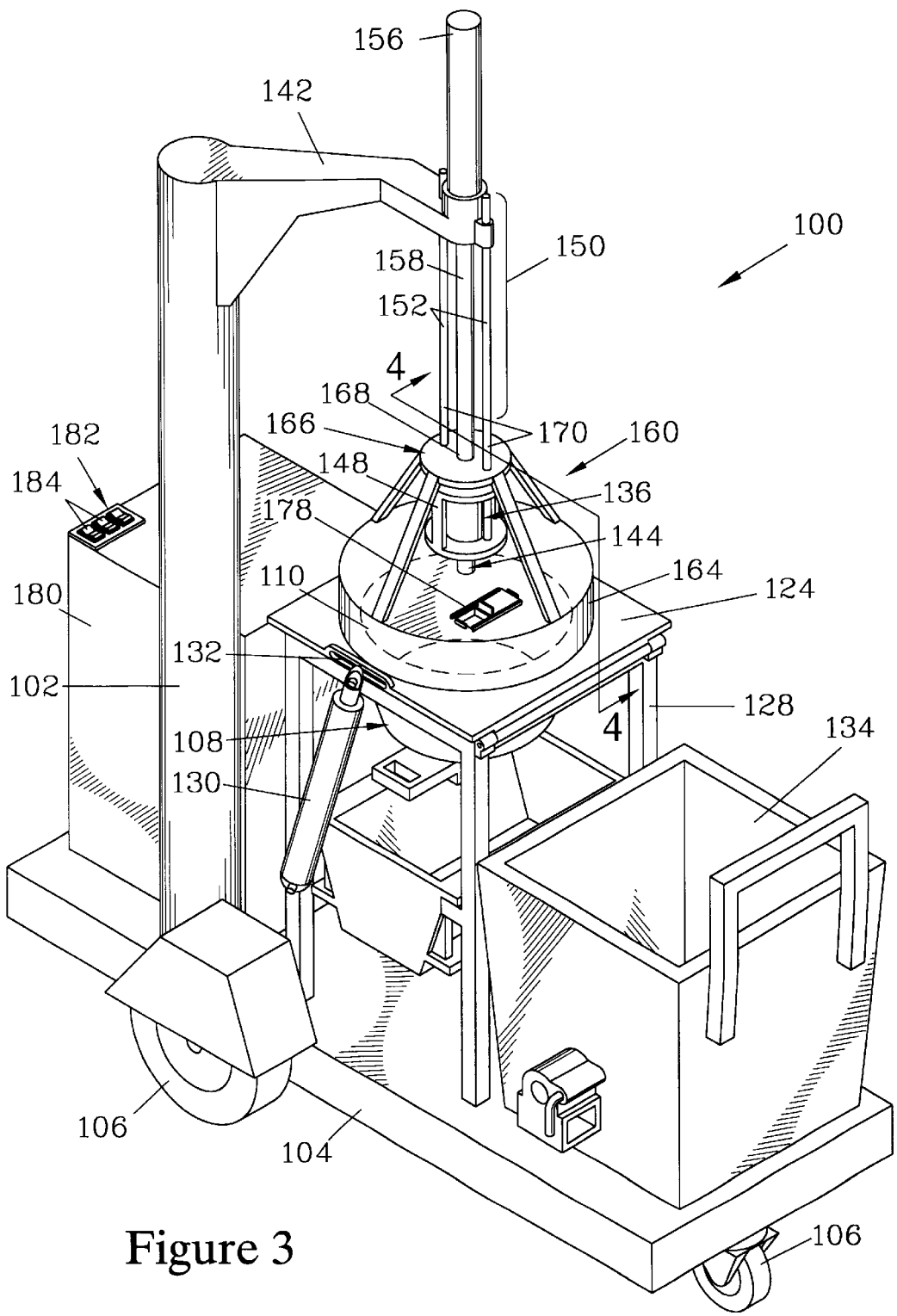
FIG. 3 is another isometric view of the dross processing system illustrated in FIG. 1. As illustrated, the hood is in a lowered position and rests on a reaction vessel support which attaches to a reaction vessel upper rim. A viewing port is provided in the hood so that the dross can be viewed during processing and additional exothermic flux can be added if such becomes necessary to promote the reclaiming of the entrapped metal.

FIGS. 1 through 4 illustrate one embodiment of an improved dross processing system 100 of the present invention. FIGS. 1 and 3 are isometric views of the improved dross processing system 100, while FIG. 2 is a partial view of the section 2—2 of FIG. 1 illustrating details of a preferred reaction vessel employed in the present invention and FIG. 4 is a view of the section 4—4 of FIG. 3. Referring first to FIGS. 1 and 3, the dross processing system 100 has a substantially vertical support 102 which, in this embodiment, is mounted on a platform 104, which in turn is mounted on wheels 106 which allow the dross processing system 100 to be readily placed in close proximity to a furnace (not shown) from which dross is to be removed.

The dross processing system 100 is also provided with a reaction vessel 108 which holds the dross to be processed. Preferably, the reaction vessel 108 is a metal double-wall vessel such as described in U.S. patent application Ser No. 09/654,314 now U.S. Pat. No. 6,464,929 of one of the present inventors, incorporated herein by reference. As shown in FIG. 2, the reaction vessel 108 includes a reaction vessel upper rim 110 and a bottom 112 spaced apart therefrom, the bottom 112 having a draft angle $\delta$ and terminating in a drain port 114. In use, a refractory fabric plug 116 is provided which seals the drain port 114 and maintains the metal and dross within the reaction vessel 108. The plug 116 is supported by a plate 118 which in turn is supported on brackets 120 attached to an outer wall 122.

A reaction vessel support 124 pivotably supports the reaction vessel 108 with respect to the substantially vertical support 102. The reaction vessel support 124 typically attaches to the reaction vessel rim 110 and, in this embodiment, the reaction vessel rim 110 resides below the reaction vessel support 124, providing a smooth exposed surface to facilitate cleaning. Thus, the reaction vessel support 124 effectively serves as an extended upper rim for the reaction vessel 108. As shown in FIGS. 1 and 3, the reaction vessel support 124 is in turn mounted to hinges 126 which are attached to a frame 128 which is mounted to the platform 104. Thus, the reaction vessel support 124 is pivotably mounted with respect to the substantially vertical support 102 via the frame 128 and the platform 104.

The dross processing system 100 is provided with means for pivoting the reaction vessel 108 between a horizontal position, where the reaction vessel upper rim 110 is substantially horizontal as shown in FIGS. 1–3, and a dump position (shown in phantom in FIG. 1), where any spent dross residing in the reaction vessel 108 is free to fall from the reaction vessel 108. In the embodiment illustrated, a dump actuator 130 is provided, which is preferably a linear actuator that is pivotably mounted with respect to the frame 120 and slidably engages a slot 132 in the reaction vessel support 124. When the dump actuator 130 is extended as illustrated in phantom in FIG. 1, the reaction vessel support 124 is rotated about the hinges 126 to move the reaction vessel 108 from the horizontal position, to the dump position illustrated in phantom, where any dross residing in the reaction vessel 108 is dumped therefrom. In the dross precessing system 100 illustrated, the platform 104 is extended to accommodate a spent dross container 134 thereon, positioned to receive the spent dross dumped from the reaction vessel 108.

A motor 136 is provided, which has a drive shaft 138 terminating in a free end 140, as shown in FIG. 1. The motor 136 is mounted to the substantially vertical support 102 via a motor support arm 142. The free end 140 of the drive shaft 138 is attached to an impeller 144, having an impeller axis 146. As discussed in greater detail below, the motor 136 is movable between a raised motor position, shown in FIG. 1, and at least one lowered motor position, shown in FIG. 3. When the motor 136 is in the raised motor position, the impeller 144 resides above the reaction vessel upper rim 110, and when the motor 136 is in any of the at least one lowered motor positions, the impeller 144 resides below the reaction vessel upper rim 110.

In one aspect of the improvement of the present invention, the motor 136 is mounted on a motor support carriage 148 which in turn is connected to the motor support arm 142 via a carriage guide 150. The carriage guide 150 limits the motion of the motor support carriage 148 to a substantially vertical path, and thus serves to stabilize the motor support carriage 148 against variations in the torsional loads introduced by the impeller 144 as the character of the dross which it encounters changes.

In the embodiment illustrated in FIGS. 1 and 3, the carriage guide 150 has a pair of rods 152, which serve as stabilizing tracks and are attached to the motor support carriage 148. The rods 152 slidably engage a pair of rod passages 154 in the motor support arm 142, which serve as track guides. The slidable engagement of the rods 152 in the rod passages 154 serves to prevent wobbling of the motor 136 when it turns the impeller 144 in the dross residing in the reaction vessel 108. It should be appreciated by one skilled in the art that various other configurations of stabilizing tracks and track guides could be employed, and that the stabilizing tracks could be mounted to the motor support arm 142, in which case the track guides are mounted to the motor support carriage 148. Preferably, the pair of rods 152 and the corresponding rod passages 154 are positioned on opposite sides of the impeller axis 146.

To provide means for lowering and raising the motor support carriage 148 with respect to the motor support arm 142, a motor height actuator 156, which in this embodiment is a linear actuator having an extendable actuator arm 158, is attached to the motor support arm 142 and to the support carriage 148. The motor height actuator moves the motor 136 and the motor support carriage 148 between the raised motor position, shown in FIG. 1, and the at least one lowered motor position, one of which is shown in FIG. 3. Alternative means for lowering and raising the motor support carriage 148 will be apparent to those skilled in the art, such as chain drives, rack and pinion mechanisms, etc. The linear actuator illustrated is selected for the motor height actuator 156 for reasons of simplicity and compactness of structure. The motor height actuator 156 serves to move the impeller 144 into and out of the reaction vessel 108. Preferably, limit switches (not shown) are provided which can be adjustably positioned and which act to limit the motion of the motor height actuator 156 to allow the traverse of the motor 136 to be changed, thereby allowing reaction vessels 108 and/or impellers 144 of varying configurations to be employed and still assure the prevention of the impeller 144 from hitting the bottom 112 of the reaction vessel 108. Adjusting the traverse of the motor 136 also allows for multiple lowered motor positions to be provided to adjust the depth of the impeller 144 in the dross retained in the reaction vessel 108.

A hood 160 is provided, which has a central hood axis 162 which is substantially aligned with the impeller axis 146. The hood 160 has a downwardly extending hood rim 164 and a hood upper structure 166 which is spaced apart from the hood rim 164. As best shown in FIG. 4, the hood upper structure 166 is provided with a hood upper structure actuator passage 168, through which the actuator arm 158 of the motor height actuator 156 passes, and a pair of hood upper structure rod passages 170, through which the pair of rods 152 respectively pass. The hood also has a drive shaft passage 172 through which the drive shaft 138 of the motor 136 passes. These passages (168, 170, and 172), in combination with the rods 152, the actuator arm 158, and the drive shaft 138, serve to maintain the alignment of the hood 160 as it moves toward and away from the reaction vessel 108, assuring that the central hood axis 162 maintains alignment with the impeller axis 146.

When the actuator arm 158 of the motor height actuator 156 is retracted to raise the motor support carriage 148 to the raised motor position, a motor carriage bearing surface 174 (shown in FIG. 4) on the motor carriage 148 is brought into engagement with a hood bearing surface 176 on the hood upper structure 166. The detail view of FIG. 4 shows the motor support carriage 148 and the hood upper structure 166 before the motor carriage bearing surface 174 has engaged the hood bearing surface 176. The engagement of the motor carriage bearing surface 174 with the hood bearing surface 176 causes the hood upper structure 166 to be lifted by the motor support carriage 148. Thus, when the motor support carriage 148 is in the raised motor position, the hood upper support structure 166 is supported on the motor support carriage 148 such that the hood rim 164 is in a spaced-apart relationship with respect to the upper rim 110 of the reaction vessel 108, as shown in FIG. 1. When the reaction vessel 108 is mounted below the reaction vessel support 124, the hood rim 164 is also in a spaced-apart relationship with the reaction vessel support 124, which effectively serves as an extension of the reaction vessel upper rim 110. In this position, a rim-to-rim separation S exists between the hood lower rim 164 and either the reaction vessel support 124 or the upper rim 110 of the reaction vessel 108. The separation S is sufficiently large as to allow readily loading dross into the reaction vessel 108 and allowing the reaction vessel support 124 to pass by the impeller 144 and the hood 160 as the reaction vessel 108 moves between the horizontal position and the dump position.

When the actuator arm 158 of the motor height actuator 156 is extended to lower the motor support carriage 148 toward its one or more lowered motor positions (as shown in FIG. 3), the hood 160 which is supported thereby is also lowered, until the hood rim 164 becomes engaged with respect to the reaction vessel upper rim 110. In this embodiment, the hood rim 164 engages the reaction vessel support 124, to which the reaction vessel upper rim 110 is attached. When the hood 160 is so positioned, it is maintained in position on the reaction vessel support 124 by its weight. Once the hood rim 164 becomes engaged with respect to the reaction vessel upper rim 110, any further lowering of the motor support carriage 148 disengages the motor carriage bearing surface 174 from the hood bearing surface 176, causing the hood upper structure 166 to be in a spaced-apart relationship with respect to the motor support carriage 148 as best shown in FIG. 4. If an object such as the hand or arm of the operator is interposed between the hood rim 164 and the reaction vessel support 124 as the hood rim 164 approaches the reaction vessel support 124, the engagement of the hood rim 164 with the object interrupts the descent of the hood 160 and acts to disengage the motor carriage bearing surface 174 from the hood bearing surface 176 as the motor support carriage 148 continues to descend. This action prevents any injury to the operator due to crushing between the hood rim 164 and the reaction vessel support 124.

Preferably, the hood 160 has a hood port 178 which can be opened, as shown in FIG. 3, to allow the operator to view the reaction process, as well as allowing the operator to add additional flux if such appears to be necessary. The hood port 178 can be closed to prevent escape of fumes.

The dross processing system 100 illustrated is also provided with a housing 180 containing a control system (not shown). The control system has a user interface 182 having a series of switches 184 that allow the operator to activate various aspects of the dross processing procedure, such as activation of the dump actuator 130, the motor 136, and the motor height actuator 156. The housing 180 preferably also contains the necessary electrical, hydraulic, and/or pneumatic power source(s) to activate the dump actuator 130, the motor 136, and the motor height actuator 156 to make the dross processing system 100 self-contained.

Figure 5:
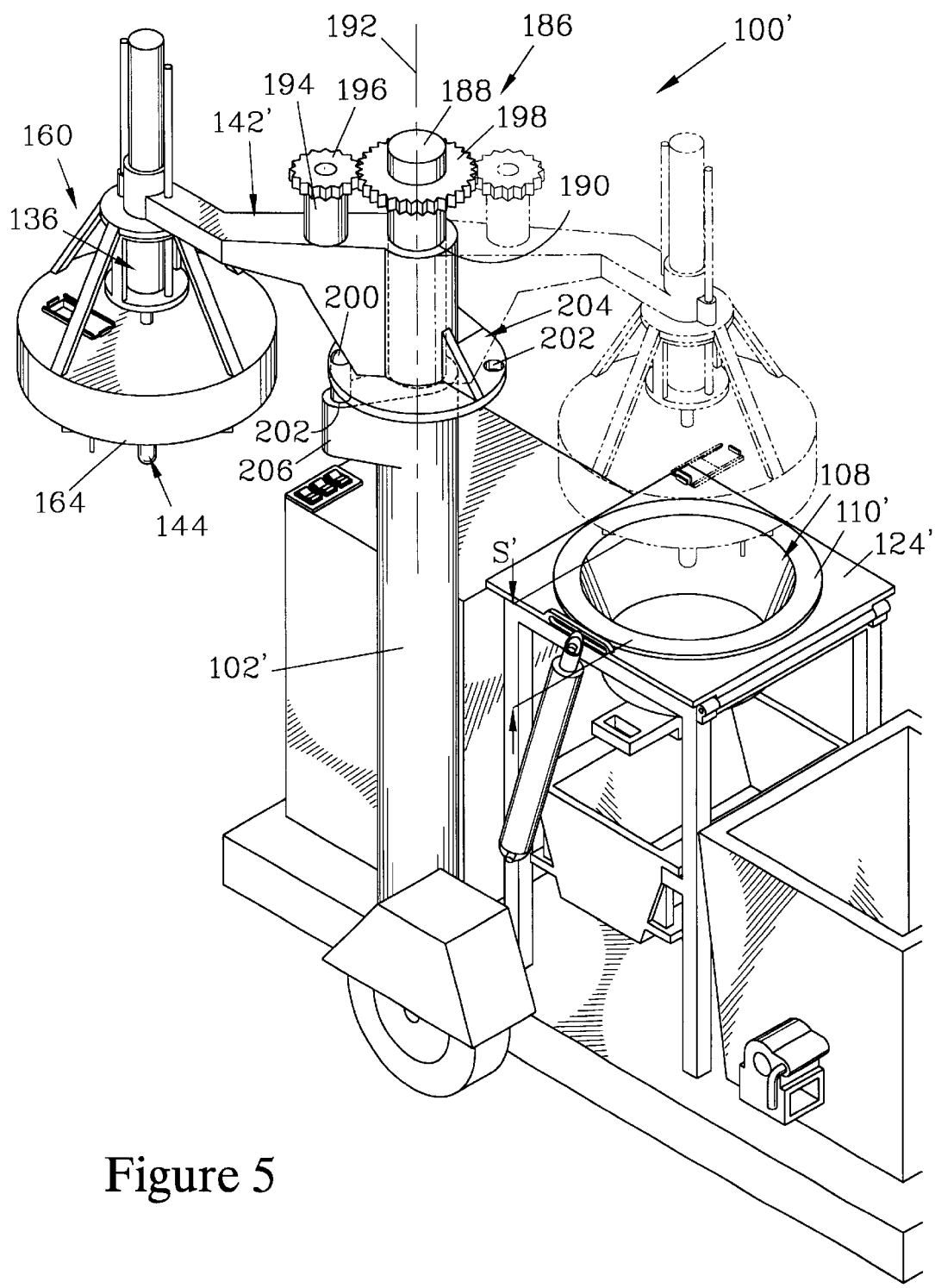
FIG. 5 illustrates another embodiment of the present invention, which shares many of the features of the embodiment illustrated in FIGS. 1 through 4. This embodiment provides a rotatable motor support arm allowing a minimal separation S between the hood rim and the reaction vessel support while still maintaining ready access to the reaction vessel for loading dross to be processed, dumping spent dross, and servicing the reaction vessel.

FIG. 5 is an isometric illustration of another embodiment of the present invention, a dross processing system 100' which has all the elements of the embodiment illustrated in FIGS. 1 and 3. However, in addition to the elements discussed above, the dross processing system 100' has a pivot mechanism 186, which connects the motor support arm 142' to the substantially vertical support 102'. The connection of the motor support arm 142' to substantially vertical support 102' by the pivot mechanism 186 allows the motor support arm 142' to be rotated between an operating position and a dross loading/dumping position. When the motor support arm 142' is in the operating position, illustrated in phantom, the motor 136 and the hood 160 are substantially aligned with the reaction vessel 108. When the motor support arm 142' is in the loading/dumping position, as illustrated, the motor 136 and the hood 160 are positioned away from the reaction vessel 108 and do not project thereon. In the dross processing system 100', the pivot mechanism 186 is provided by a post 188, which is mounted to the substantially vertical support 102', in combination with a post passage 190 in the motor support arm 142' which rotatably engages the post 188, thereby allowing the motor support arm 142' to rotate with respect to the substantially vertical support 102' about a vertical axis 192.

In the dross processing system 100', the separation S' between the hood rim 164 and the reaction vessel support 124 when the motor 136 is in the raised motor position only need be sufficiently large as to allow the impeller 144 to be rotated beyond the reaction vessel upper rim 110' and the reaction vessel support 124'. Since the reaction vessel support 124' is pivoted to the dump position only after the motor support arm 142' has been rotated to the loading/dumping position, the separation S' of this embodiment need not be sufficient to accommodate such pivoting of the reaction vessel support 124'.

Means for rotating the motor support arm 142' between the operating position and the loading/dumping position are preferably provided. Such means could be provided by linear or rotary actuators, gear drives, rack and pinion mechanisms, and similar motivating means well known to one skilled in the art. In the embodiment illustrated in FIG. 5, the means for rotating the motor support arm 142' between the operating position and the loading/dumping position employs a servo motor 194 mounted on the motor support arm 142' and having a servo gear 196, in combination with a post gear 198 affixed to the post 188 and configured to be engaged by the servo gear 196. As the servo motor 194 drives the servo gear 196 to move the servo gear 196 around the post gear 198, the motor support arm 142' is moved about the post 188 between the loading/dumping position and the operating position (illustrated in phantom).

Means for locking the motor support arm 142' in both the loading/dumping position and the operating position are preferably also provided. In the dross processing system 100' illustrated, a locking pin 200 is mounted to the substantially vertical support 102' to lock the motor support arm 142' in position. The locking pin 200 slidably engages indexing holes 202 in an indexing plate 204 which is affixed to the motor support arm 142'. A pin actuator 206 lowers and raises the locking pin 200 such that the motor support arm 142' can be locked and unlocked when positioned in either the dross loading/dumping position or the operating position. To position the motor support arm 142' such that the locking pin 200 can engage one of the indexing holes 202, it is preferred for limit switches (not shown) to deactivate the servo motor 194 when one of the indexing holes 202 in the indexing plate 204 is aligned with the locking pin 200. The servo motor 194 can then be reactivated in the reverse direction when the locking pin 200 is withdrawn from the indexing hole 202 in which it is engaged. The engagement of the locking pin 200 with one of the indexing holes 202 helps stabilize the motor support arm 142' to further stabilize the impeller 144 as it encounters irregularities in the dross.

As also illustrated in FIG. 5, in the dross processing system 100' the reaction vessel upper rim 110' is mounted above the reaction vessel support 124'. Thus, when the hood 160 is lowered, the hood rim 164 can be configured to directly engage the reaction vessel upper rim 110'. Alternatively, when the hood rim 164 is larger in diameter than the reaction vessel upper rim 110', it can surround the reaction vessel upper rim 110' to engage the reaction vessel support 124' to which the reaction vessel upper rim 110' is attached.

In operating a dross processing system such as illustrated in FIGS. 1 through 5, it has been found particularly effective to be able to vary the motion imparted to the impeller 144 when it is processing dross contained in the reaction vessel 108. Preferably, the impeller 144 is rotated in a cyclic reversing motion, where the impeller 144 is rotated in one direction for a certain interval of time, and then rotated in the opposite direction for a length of time, this cycle repeating until the desired duration of processing has elapsed. When the motor 136 has more than one lowered motor position, the depth of the impeller 144 in the dross can be varied as well.

While the dross processing system of the present invention can be manually operated, it is preferred to have the functions automated to reduce the burden on the furnace operator, particularly when the impeller is operated in a cyclic reversing manner. This can be done by providing a control system, which can be either hardwired or, alternatively, controlled by a microprocessor. The use of a microprocessor is preferred, since it allows the cycle of the impeller to be readily modified so that its action can be best matched to the quantity and character of the dross being processed.

Figure 6:
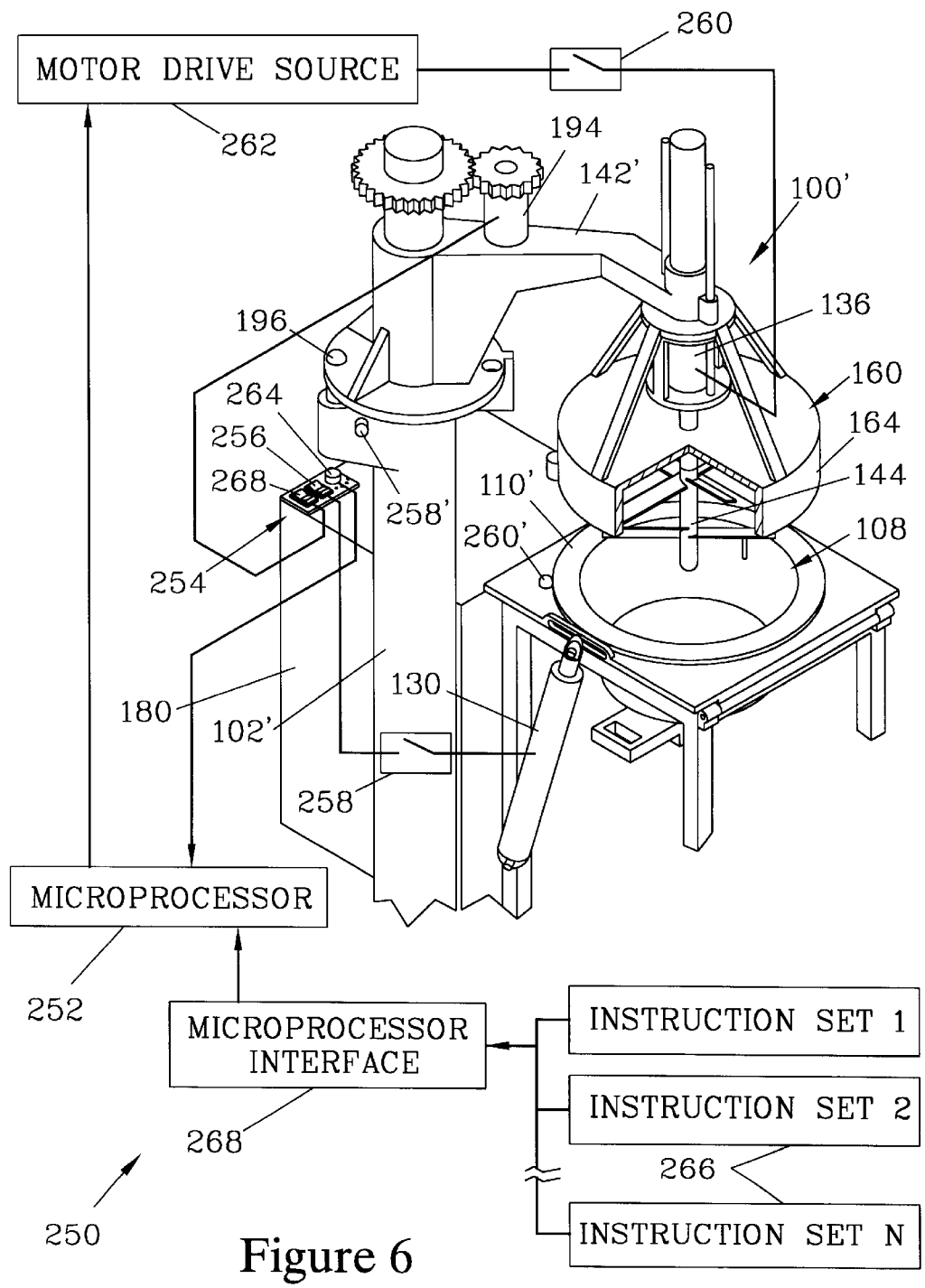
FIG. 6 is a sketch of a control circuit which employs a microprocessor in combination with a control panel to automate various aspects of a dross processing system such as that shown in FIG. 5.

FIG. 6 schematically illustrates one example of a control system 250 which can be employed to partially automate the operation of the dross processing system 100' discussed above. The control system 250 employs a microprocessor 252 to control, in part, the dross processing cycle. The control system 250 has an operator control panel 254 mounted to the housing 180, in which the microprocessor 252 and related elements may be housed. The control panel 254 illustrated has a dump/process switch 256 for activating the dump actuator 130 to control pivoting the reaction vessel 108 from its load/processing position to a dump position. Preferably, a safety switch 258 is provided which disables the dump/process switch 256 when the motor support arm 142' is in the operating position, where the hood 160 resides above the reaction vessel 108. In such a case, a contact switch 258' can be mounted on the substantially vertical support 204 to disable the dump actuator 130 when the motor support arm 142' releases the contact switch 258' as the motor support arm 142' rotates away from the loading/dumping position.

It is further preferred that a disable switch 260 be provided, which disables the motor 136, which is driven by a motor drive source 262. The nature of the motor drive source 262 depends on the type of the motor 136 employed. In the case where the motor 136 is an electric motor, the motor drive source 262 is the electrical connection, while in the case of a hydraulic motor, the motor drive source 262 is the pressurized fluid. The disable switch 260 disables the motor 136 when the impeller 144 is withdrawn from the reaction vessel 108, thereby deactivating the impeller 144. Such can be accomplished by a disable switch 260' mounted on or near the reaction vessel upper rim 110, which deactivates the motor 136 when the disable switch 260' is not engaged by the hood rim 164. It is also preferred to reverse the direction of the motor 136 when the impeller 144 encounters extreme resistance, using a reverse switch (not shown). When the motor 136 is a hydraulic motor, it is preferred for a pressure-limiting switch to be employed as a reverse switch.

The control panel 254 also has a cycle switch 264 which allows an operator to vary the cycle that the impeller 144 uses to process the dross. While these cycles could be controlled by dedicated circuits, in this embodiment the cycle of the impeller 144 is controlled by the microprocessor 252 in combination with instruction sets 266. A microprocessor interface 268 is preferably provided so that the instruction sets 266 can be updated to increase the flexibility of the control system 250. Each of the instruction sets 266 instructs the microprocessor 252 to control the elements of the control system 250 and the dross processing system 100' to establish an impeller/reaction vessel processing cycle. This cycle defines a depth profile for the impeller 144 over time, as well as an angular velocity and reversing interval for the impeller 144. The parameters of the cycles can be tailored to suit particular conditions of the dross to be processed. Such cycles could be determined experimentally to optimize recovery from the particular dross types encountered at the site where the system 250 is located, and the instruction sets 266 adjusted to provide the optimized cycles.

The dross which forms on a molten metal bath can vary in texture as well as composition. For Aluminum metal baths, the dross varies substantially in appearance, although in most cases there is a significant metallic Aluminum content. Some dross has what might be characterized as a dry appearance, and has a rather powdery appearance. In such cases, the metal does not wet the nonmetallic component of the dross and is not trapped in an oxide coating, and thus tends to readily settle out of the dross. In other situations, the dross may have a wet appearance where the metal content may be higher but where the metal is less readily separable due the metal wetting the non-metallic component and the molten metal present having highly oxidized surfaces which limits its ability to coalesce. It has been found that dry drosses can be effectively processed by employing relatively short mixing cycles, and require little flux to promote the extraction of aluminum from the dross. On the other hand, for a wet dross, it is important that more rigorous mixing and larger flux addition be employed to extract the metal from the dross.

It should be appreciated by one skilled in the art that additional aspects of the dross recovery process could be automated, such as the addition of flux and/or the draining of the recovered metal from the reaction vessel 108.

When the control system 250 is employed with a dross processing system 100' where the motor support arm 142' rotates about the substantially vertical support 102' to allow it to be rotated between a loading/dumping position and an operating position, the control panel 254 is preferably provided with a motor positioning switch 268 which activates the servo motor 194.

When the locking pin 196 is provided, the motor positioning switch 268 preferably controls both the servo motor 194 and the locking pin 196 to allow an operator to toggle the motor support arm 142' between the loading/dumping position and the operating position with a single push on the motor positioning switch 268.

Figure 7:
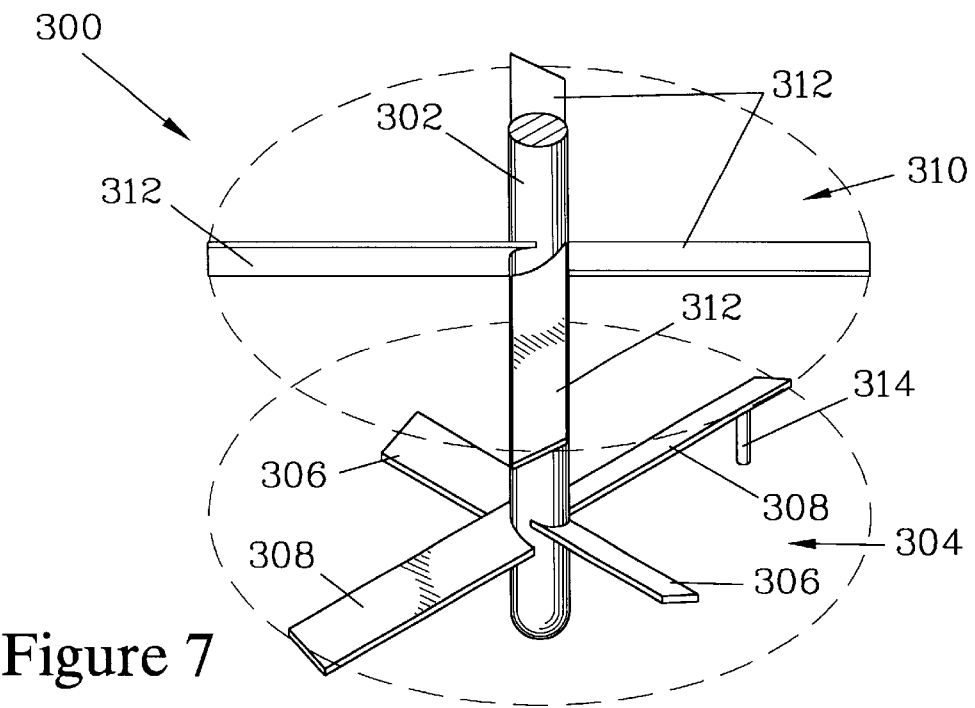
FIG. 7 illustrates an improved impeller which forms part of the present invention. The impeller has two agitating surfaces. A first agitating surface has two pairs of opposed first agitator blades while a second agitation surface has two pairs of opposed second agitator blades. The agitator blades of the first agitation surface are offset from the agitator blades of the second agitation surface by 45° with respect to the horizontal plane.

FIG. 7 is an isometric view of an impeller 300 of a preferred embodiment of the present invention. The impeller 300 has an impeller shaft 302, to which a first agitation surface 304 is attached. The first agitation surface 304 has two pairs of first agitation blades (306, 308) which are attached to the impeller shaft 302. Each pair has its blades (306, 308) opposed, and the two pairs are positioned substantially normal to each other. It is further preferred that one of the pairs have blades (306) which are shorter than the blades (308) of the other pair to provide a region into which to collect oversize material.

A second agitation surface 310 is provided, which is formed by two pairs of second agitation blades 312 which are opposed to each other and are positioned such that the first agitation surface 304 and the second agitation surface 310 are parallel. Preferably, the blades (306, 308) of the first agitation surface 304 are offset by 45° with respect to the horizontal plane from the blades 312 of the second agitation surface 310. It is also preferred for the blades (306, 308) of the first agitation surface 304 and the blades 312 of the second agitation surface 310 to have opposite pitches. Preferably, the blades (306 and 308) are pitched such that their inclination with respect to the horizontal plane is substantially the same as the draft angle δ (shown in FIG. 2) of the bottom 112 of the reaction vessel 108 when the impeller shaft 302 is vertically oriented.

In this embodiment, one of the longer first agitation blades 308 has a mixing rod 314 attached thereto, which assists in agitating the dross when maintained in the reaction vessel such as illustrated in FIG. 2. When the impeller 300 is so employed, the mixing rod 314 serves to agitate the dross below the first agitation surface 304 and in close proximity to the bottom 112 of the reaction vessel 108.

As discussed above with regard to FIG. 2, the refractory fabric plug 116 is installed into the drain port 114 of the reaction vessel 108 to prepare the reaction vessel 108 for receiving a load of dross. The plug 116 serves to seal the drain port 114 to maintain the metal and dross within the reaction vessel 108 during the processing operation. It has been found that the correct placement of the plug 116 is critical to providing an effective seal for the drain port 114. Placement of the plug 116 becomes difficult when it is replaced while the reaction vessel 108 is hot from having been in service.

Figure 8:
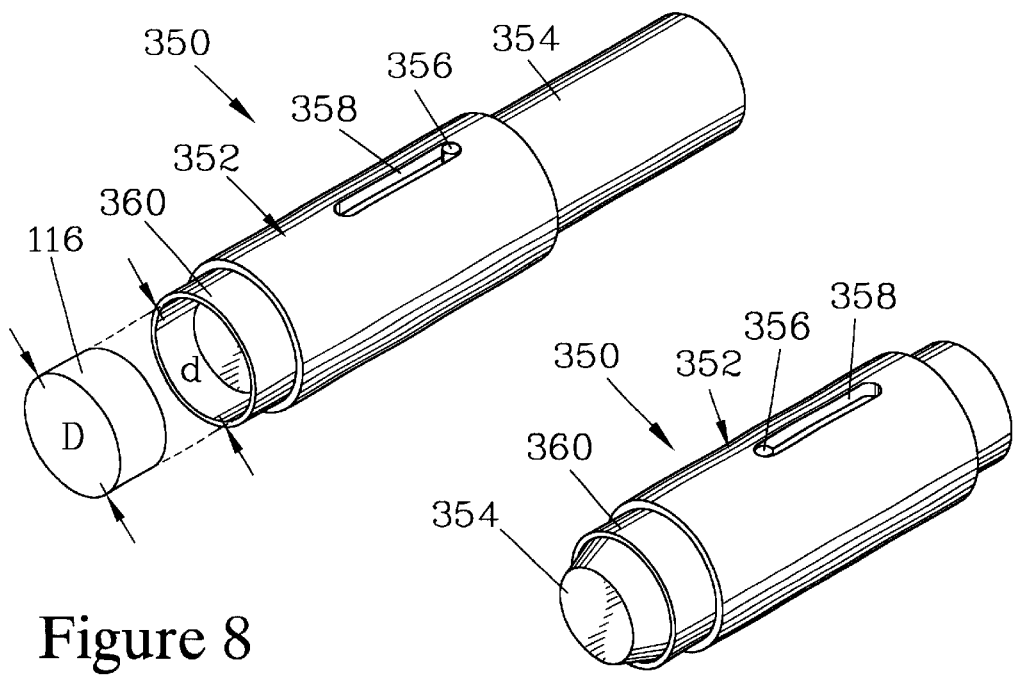
FIG. 8 is an isometric view of a plug setting tool for assisting in setting refractory fabric plugs into a port of a reaction vessel. The plug setting tool has a tube, and a plunger which is configured to slidably engage the tube.
Figure 9:
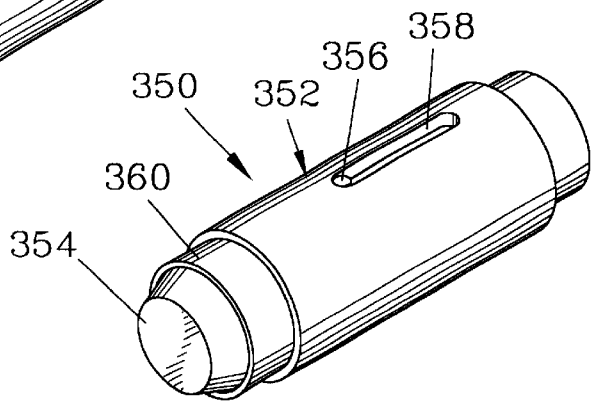
FIG. 9 illustrates the plug setting tool shown in FIG. 8 where the plunger is positioned to forcibly insert the plug into the port of the reaction vessel.

FIGS. 8 and 9 illustrate a plug setting tool 350 which has been developed to assist in the placement of the plug 116 into the drain port 114. The plug setting tool 350 has a tube 352 having an internal diameter d which is slightly less than a plug diameter D of the plug 116. A plunger 354 slidably engages the tube 352 and is maintained in the tube 352 by a post 356 which rides in a slot 358 in the tube 352. When the plunger 354 of the plug setting tool 350 is in the retracted position, as illustrated in FIG. 7, the plug 116 can be inserted in the tube 352 and will be maintained therein by friction until such time as the plunger 354 is depressed, as is shown in FIG. 9. Thus, the plug 116 can be readily positioned for insertion into the drain port 114 of the reaction vessel 108 while maintained in the tube 352, and then inserted into the drain port 114 by depressing the plunger 354.

To facilitate accurate positioning of the plug 116 into the drain port 114, it is preferred for the tube 352 to have an end region 360 which is narrowed so as to fit into the drain port 114. Inserting the end region 360 into the drain port 114 assures that the plug 116 is centered in the drain port 114 and avoids shearing the edges of the plug 116 during the setting process.

While the novel features of the present invention have been described in terms of particular embodiments and preferred applications, it should be appreciated by one skilled in the art that substitution of materials and modification of details obviously can be made without departing from the spirit of the invention.

What we claim is:

1. An improved dross processing system for recovering metal from dross skimmed from a metal melt of a melting furnace, the dross processing system having;
   a substantially vertical support positionable so as to be in close proximity to the melting furnace,
   a reaction vessel for holding the skimmed dross, the reaction vessel having a reaction vessel upper rim, and a bottom terminating in a drain port,
   a reaction vessel support which pivotably supports the reaction vessel with respect to the substantially vertical support,
   means for pivoting the reaction vessel between a horizontal position, where the upper rim is substantially horizontal, and a dump position, where the dross residing in the reaction vessel may fall therefrom,
   a motor having a drive shaft with a free end,
   a motor support arm attaching to the substantially vertical support, and
   an impeller having an impeller axis, the impeller attaching to the free end of the drive shaft such that, when the motor is in a raised motor position and aligned with the reaction vessel, the impeller resides above the reaction vessel upper rim, and when the motor is in an at least one lowered motor position and aligned with the reaction vessel, the impeller resides below the reaction vessel upper rim,
   the improvement comprising:
      a motor support carriage to which the motor is mounted;
      a carriage guide mounted to the motor support arm and directing said motor support carriage along a substantially vertical path;
      means for raising and lowering said motor support carriage relative to the motor support arm so as to move the motor between the raised motor position and the at least one lowered motor position.

2. The improved dross processing system of claim 1 wherein the improvement further comprises:
   a hood having a hood central axis, which is substantially aligned with the impeller axis of the impeller, a downwardly extending hood rim, and a hood upper structure, said hood being configured such that,
      said hood upper structure is engaged by said motor support carriage and lifted thereby when said motor support carriage is moved to the raised motor position, said hood rim being in a spaced-apart relationship to the reaction vessel upper rim when said hood is substantially aligned with the reaction vessel and said motor support carriage is in the raised motor position, and
      when said motor support carriage is in the at least one lowered motor position and said hood is substantially aligned with the reaction vessel, said hood rim is engaged with respect to the reaction vessel upper rim.

3. The improved dross processing system of claim 2 wherein the motor support arm is rotatable between a loading/dumping position, where the projection of said hood lies outside the footprint of the reaction vessel, and an operating position, where the projection of said hood is substantially centered with respect to the reaction vessel, the improvement further comprising:
   actuating means for rotating the motor support arm between the loading/dumping position and the operating position.

4. The improved dross processing system of claim 1 wherein said means for raising and lowering said motor support carriage is provided by a motor height actuator connected between the motor support arm and said motor support carriage.

5. The improved dross processing system of claim 4 wherein said motor height actuator is a linear actuator having an extendable actuator arm attached to said motor support carriage.

6. The improved dross processing system of claim 5 wherein said carriage guide further comprises:
   at least two stabilizing tracks which slidably engage track guides, said at least two stabilizing tracks and said track guides being so attached to the motor support arm and to said motor support carriage as to prevent wobbling of the motor as the impeller agitates dross contained in the reaction vessel.

7. The improved dross processing system of claim 6 wherein said at least two stabilizing tracks are a pair of rods and said track guides are a pair of passages configured to slidably engage said pair of rods.

8. The improved dross processing system of claim 7 wherein said pair of rods are affixed to said motor support carriage and said pair of passages are provided on the motor support arm.

9. The improved dross processing system of claim 2 wherein the improvement further comprises:
   a closable hood port in said hood.

10. The improved dross processing system of claim 1 wherein the improvement further comprises:
    a control system for controlling the motor and said means for raising and lowering said motor support carriage.

11. The improved dross processing system of claim 10 wherein said control system further comprises:

a microprocessor which controls the motor and said means for raising and lowering said motor support carriage.

12. The improved dross processing system of claim 11 wherein said microprocessor also controls the means for pivoting the reaction vessel between a horizontal position and a dump position.

13. The improved dross processing system of claim 12 wherein the motor support arm is rotatable between a loading/dumping position, where the projection of the impeller lies outside the footprint of the reaction vessel, and an operating position, where the projection of the impeller is substantially centered with respect to the reaction vessel, the improvement further comprising:

actuating means for rotating the motor support arm between the loading/dumping position and the operating position, and further wherein said microprocessor controls said actuating means for rotating said motor support arm as well as controlling the action of said means for raising and lowering said motor carriage and activation of the motor.

14. The improved dross processing system of claim 13 wherein the improvement further comprises:

a safety switch which deactivates the means for pivoting the reaction vessel when the motor support arm is not in the loading/dumping position.

15. The improved dross processing system of claim 14 wherein the improvement further comprises:

a disable switch which prevents activation of the motor when the impeller is positioned outside the reaction vessel.

16. The improved dross processing system of claim 10 wherein said control system controls the motor so as to impart a cyclic reversing motion to said impeller.

17. The improved dross processing system of claim 1 wherein the impeller further comprises:

a first agitation surface having at least one pair of first agitation blades which are substantially opposed; and a second agitation surface having at least one pair of second agitation blades which are substantially opposed, said at least one pair of first agitation blades and said at least one pair of second agitation blades are being parallel and offset with respect to each other in the horizontal plane.

18. The improved dross processing system of claim 17 wherein said blades of said first agitation surface and said blades of said second agitation surface have opposing pitches, and further wherein at least one of said at least one pair of first agitation blades has a stirring rod attached thereto and extending toward the bottom of the reaction vessel.

19. The improved dross processing system of claim 18 wherein said motor is hydraulic and imparts a cyclic reversing motion to said impeller.

20. The improved dross processing system of claim 1 wherein the drain port of the reaction vessel is sealed by a refractory fiber plug, the improvement further comprising:

a plug setting tool having a tube, which is sized to accept the plug and configured to engage the reaction vessel in the vicinity of the drain port, and a plunger which resides inside said tube and can be depressed to eject the plug from said tube.

* * * * *